United States Patent [19]

Hoshino

[11] 3,841,266
[45] Oct. 15, 1974

[54] APPARATUS AND METHOD FOR ARTIFICIAL CULTIVATION OF SHRIMP

[75] Inventor: Shohei Hoshino, Miyazaki, Japan
[73] Assignee: Asahi-Dow Limited, Tokyo, Japan
[22] Filed: Mar. 6, 1973
[21] Appl. No.: 338,626

[30] Foreign Application Priority Data
Mar. 6, 1972    Japan.............................. 47-22231

[52] U.S. Cl. ................................................ 119/2
[51] Int. Cl. ........................................... A01k 61/00
[58] Field of Search ............................... 119/2, 3, 4

[56] References Cited
UNITED STATES PATENTS

| | | | |
|---|---|---|---|
| 3,083,686 | 4/1963 | Thorsell et al. .......................... | 119/3 |
| 3,118,424 | 1/1964 | Willinger ................................. | 119/3 |
| 3,473,509 | 10/1969 | Miyamura ............................... | 119/2 |
| 3,477,406 | 11/1969 | Fujinaga ................................. | 119/2 |

Primary Examiner—Hugh R. Chamblee
Attorney, Agent, or Firm—Flynn & Frishauf

[57] ABSTRACT

Apparatus and method suitable for high density cultivation of crustaceans, particularly shrimp, in which is used a habitat mat made essentially of a soft porous synthetic resin lock material which habitat mat has been suspended in water of an artificial environment, cultivation pond or tank separated from the ocean by some means.

The use of the above-mentioned habitat mat results in such advantages that not only the degree of internecine struggle of crustaceans is decreased, but also the exchange and cleaning of the habitat mat are simple, unlike in the case of the conventional subaqueous sand material, so that the preservation of habitat environment is easy.

9 Claims, 3 Drawing Figures

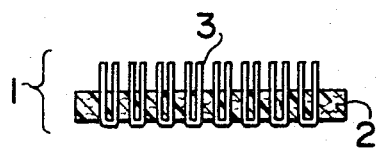
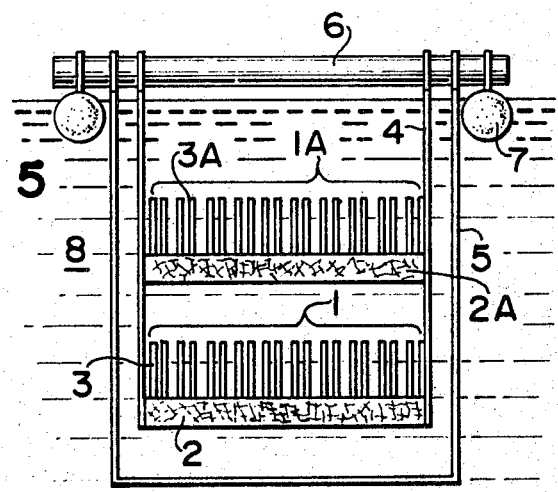
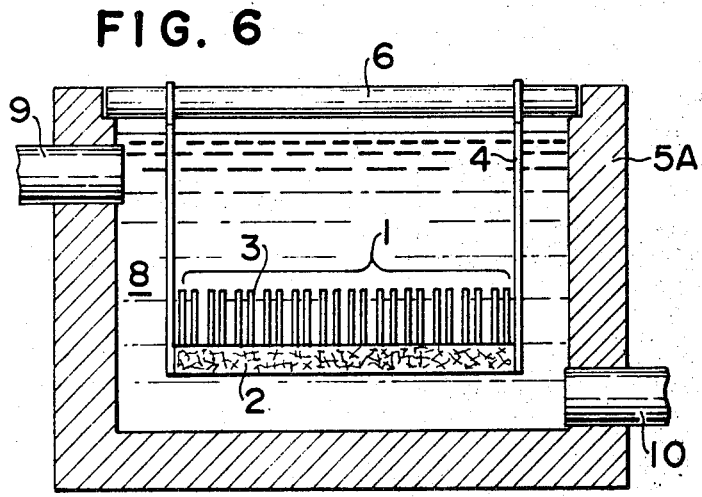

APPARATUS AND METHOD FOR ARTIFICIAL CULTIVATION OF SHRIMP

This invention relates to apparatus and method for artificial culture of crustaceans. More particularly, the invention pertains to an artificial habitat mat suitable for high density cultivation of shrimp and to a method for high density cultivation of shrimp using the said habitat mat.

At present, when the fishery technique is advancing from harvesting fishery to cultivating fishery, the cultivation of fishes, particularly "hamachi" (artificially cultured young yellow tail) and the like, has come to be commercially payable to a sufficient extent as the result of repeated extensive studies. As to the cultivation of crustaceans, particularly shrimp, many attempts have also been proposed and practiced hitherto. However, the progress in the field of cultivation of crustaceans is behind the progress in the field of cultivation of fishes. In the cultivation of crustaceans (which are called sea bottom-living animals), particularly such invertebrate animals as shrimp, which, unlike fishes, require as their living places a sand layer at the sea-bottom and a water environment above the sand layer, it is necessary to establish the bottom material in the first place.

In the case of shrimp, e.g. *Penaeus japonicus* (Kunuma shrimp), larvae hatched from eggs become leg-bearing shrimp through nauplius, zoea, mysis and post larvae stages. At these four stages, the larvae spend their floating life. Living environments of the larvae at said four stages are the same as those of planktons and fishes. However, the leg-bearing shrimp require the sea-bottom sand as a living environment. Methods for cultivation of shrimp have been studied and examined according to the said living modes of shrimp which are roughly divided into two, and several proposals have been made with respect to such cultivation methods. However, the cultivation of shrimp at said four stages can sufficiently be accomplished by utilizing the conventional method for cultivation of fishes or planktons, either as it is or with more or less improvement. As to the bottom material necessary for the living of shrimp at their leg-bearing stage, there have been proposed many materials using sand layers with an aim to provide bottom materials which are close to natural state as far as possible (refer to Japanese Patent Publication No. 9,572/1960, and U.S. Pat. Nos. 3,477,406 and 3,473,509). In addition to the methods using sand layers, there has also been proposed from old times a method using large quantities of piled seaweeds or plant leaves (refer to Japanese Patent Publication No. 3,471/1959). However, this latter method is not suitable for large scale production, since the materials used are natural products and hence are easily putrefied, and those which are uniform in quality cannot be obtained in large quantities.

It is known from the aforesaid known literature materials using and layers that all problems, which are encountered in the cases where sea bottom-living animals are cultivated in artificially confined places, are how to cope with the contamination of cultivation environments. That is, the problems reside in how to exclude the accumulation of residual foods and excrements and how to remove such poisonous substances as ammonia nitrogen, nitrous nitrogen and hydrogen sulfide. In the method of Japanese Patent Publication No. 9,572/1960, a sand layer is formed on an artificial environment, and air and water are forcibly recycled through the sand layer. The production mode adopted in U.S. Pat. Nos. 3,477,406 and 3,474,509 is such that the pond water is exchanged by utilization of tide fluctuation. After all, each of the methods of said U.S. patents is of such a type that shrimp are produced by use of a large open-air pond of the tide pool type.

In these methods, such labor and expense have been spent for the establishment of bottom materials and for the purification thereof [refer to pages 12–13 of the Collection of Gists of Lectures (Various problems on the multiplication, particularly cultivation, of crustaceans) given in the 1972 Symposium of Japan Fishery Association, Autumn Meeting]. For example, there have been adopted such procedures that predatory fishes are excluded from the cultivation farm; sol-like substance at the pond bottom is removed; a circulating pump is charged into the pond to expose the pond water to air, thereby preventing the aging of the upper and lower water layers; sand is charged into the pond to rejuvenate the pond; a feeding place is particularly provided in the pond to intend the reasonable utilization of the pond bottom; or the cultivation is temporarily discontinued and fresh sand is charged into the pond to rejuvenate the pond. Nevertheless, the reported yield is about 250 g/m$^2$ per year.

Recently, it has been reported that such a favorable yield as 1 kg/m$^2$ per year could be attained by adoption of such procedure that a pond of about 2 m. in water depths was aerated by means of blowers arranged at substantially equal intervals at the pond bottom, and a large amount of pond water was forcibly exchanged with fresh water by use of a vertical pump. It has also been reported that experiments were carried out in such a manner that a double-bottomed cylindrical water tank was used as the cultivation tank, abundant fresh sea water was continuously supplied to the tank, and cast-off skins, excrements, residual foods and the like were removed automatically or semi-automatically, whereby a best yield of 2.5 kg/m$^2$ per year was attained, but in the course of experiments, most of the shrimp were attacked by infectious disease and were substantially killed in some cases, and it was found the outbreak of disease was related to the manner of mangement of environment and the nutrients (refer to the aforesaid Collection of Gists of Lectures given in the Symposium). In any case, enormous equipments and costs have been required for the maintenance of environment in the high density cultivation of shrimp.

Since shrimp are sea bottom-living animals as mentioned previously, bottom materials used for artificial cultivation of shrimp have been nothing but those which are similar to the land used in agricultural cultivation.

As to the artificial cultivation of shrimp, the present inventors noticed the following points:

1. For the artificial cultivation of shrimp, unlike fishes, a habitat corresponding to sand layer is indispensable, and such habitat should be composed of a material which is not affected by the environmental contamination that has been the greatest problem in the conventional cultivation of shrimp, or can be simply freed from such contamination even if the material has been affected thereby.

2. For large scale cultivation of shrimp, a material used for habitat should be one which is uniform in quality and can be produced in large quantities on commercial scale.

As to the point (1), the inventors considered that instead of sand or such pile of natural substance as disclosed in Japanese Patent Publication No. 3,572/1960, there might be used any material so far as it can provide a place in which shrimp can hide. As the result of studies on the above-mentioned point, the inventors have found that a porous composite of a synthetic fiber lock can successfully be used as the habitat mat. A pile of natural substance, which, like sand, is high in specific gravity and requires great power for circulating pump or such fixed equipment as pump or the like for the washing thereof, is not practical and cannot cope with unexpected occurrence of sea contamination or outbreak of disease.

An object of the present invention is to provide a novel method for high density artificial cultivation of shrimp at stages from legbearing baby shrimp to adulthood.

Another object of the present invention is to provide an apparatus suitable for artificial cultivation of shrimp.

Still another object of the present invention is to provide an artificial bed for growing shrimp.

The method for artificial culture of shrimp according to the present invention comprises cultivating shrimp at stages from leg-bearing baby shrimp to adulthood by the use of an artificial bed, namely, habitat mat.

HABITAT MAT

The most particular feature of the method according to the present invention resides in the use of a novel habitat mat as an artificial bed in place of natural sand. The habitat mat of the present invention is a porous composite having a specific structure made essentially of synthetic fiber locks. The mat has a structure having three-dimensional networks and interconnected pores formed thereby. Said three-dimensional networks are formed by the entanglement of synthetic fiber locks. The porosity of the mat is required mainly for the sake of prevention of environmental contamination unfavorable for culture of shrimp. In addition, the pores may at times supply resting places for shrimp with smaller size. For this purpose, the composite should have a bulk density in the range of from 0.03 to 0.15 g/cm$^3$ to afford sufficient amount of pores. As materials constituting the composite as mentioned above, there may be used synthetic fibers such as saran fiber (polyvinylidene chloride type fiber), polyamide fiber, polyester fiber and the like which are resistant to sea-water. Saran fibers or fibers consisting mainly of saran fibers are particularly preferred, since no anchor or other fixing means is required for settlement of the composite made of these fibers due to their specific gravities higher than that of sea-water. The fibers are required to be crimped or curled to impart flexibility or elasticity to the composite. (We refer generally to the term "fiber lock" as a curled or crimped fiber in the specification and claims.) Furthermore, if the fiber used to form the lock material is excessively large in diameter, the living bodies are sometimes injured. Accordingly, the fineness of the fiber lock is preferably from 0.03 to 0.3 mm in diameter in order to provide a comfortable bed for shrimp. The composite may be colored, if desired, in such colors as resembling natural environment (e.g. brownish color of sand) to provide an environment favored by shrimp. For similar purposes, the composite may also contain, intertwined therein, naturally occurring fibers or strands obtained from trees such as hemp palm. The composite should have a thickness sufficient to hold shrimp in the sea. Generally, the thickness should be not less than 0.5 cm. The thickness of the composite is selected depending on the cultivation area, the size and number of shrimp, etc. The composite should not be too thick for the purpose of effective circulation of sea-water as well as from an economical point of view. Usually, the thickness is preferably in the range of from 1 to 10 cm.

The composite as described above may most preferably be prepared according to methods for preparation of so called "lock material". Referring now to conventional methods for preparation of typical lock materials made of saran fibers, straight saran fibers (either mono- or multi-filament) are cut into staples with length from 100 to 150 mm, admixed optionally with staples of other fibers such as naturally occurring fibers, and crimped by heat treatment such as milling on a heated roll. The crimped staples are subjected to heat set, and thereafter loosened. Then, the staples are arranged in multi-layers and saran latices are sprayed thereon. After drying, the coated staples are molded into a composite by heat treatment. As another method, crimped saran fibers, cut in length from 51 to 80mm, are directly formed in sheets, put into arrangement in multi-layers, coated with saran latices, dried and molded into a composite.

Alternatively, other methods for preparing nonwoven fabrics may also be used. Namely, synthetic fibers mechanically positioned in a random manner as bonded with a synthetic adhesive or rubber latex. The sheets thus formed can be pressed together to form porous mats.

Another preferred embodiment of the habitat mat is composed of a porous composite as described above and a forest of seaweed-like strips fixed thereon. The shrimp live mainly on the mat. While small, however, they may also find places for concealing themselves in the porous composite. As they grow bigger, they lose places for solitary rest. Thus, in the present invention, plastic tapes fixed on the composite are found to provide suitable compartments for rest.

The forest of seaweed-like strips is not only a place in which the shrimp rest and hide but also a living place in which they take exercise and find their foods. As the seaweed-like strips, there are used, so as not to injure the shrimp due to contact therewith, plastic film tapes of less than 1.0 in apparent specific gravity which are so soft as to be insufficient in vertical self-sustainability in an ordinary state but can erect upright in sea water due to buoyancy. The height of the individual seaweed-like strips is preferably from 50 to 200 mm. If the height is excessively short, the living zone of shrimp becomes narrower, and if the height is excessively long, not only the exercise of shrimp is disturbed but also the degree of water circulation becomes low to make it difficult to maintain the environment clean. The thickness of the individual strips is preferably 0.1 mm. or less in connection with the plasticity thereof. The width of the individual strips is practically from about 2 to about 10 mm. If the width is excessively broad, not only the exercise of shrimp is disturbed but also the degree of water circulation becomes low, like in the case where the length is excessively long.

The strips are preferably planted at such a density as one strip per 4 to 25 cm² of the base mat. If the density is lower, the place for hiding of shrimp becomes narrower and the cultivation quantity per unit area becomes smaller. If the density is higher, the exercise of shrimp is disturbed and the degree of water circulation becomes low. The planting of the strips to an unnecessarily high density requires much labor, and hence is not advantageous from the economical standpoint. The strips may be planted at random over the whole surface of the mat, or may be planted in the form of blocks or lanes. The color of the strips varies depending on the kind of shrimp. As the result of experiments, however, it has been found that the color is preferably a brownish color similar to the body color of shrimp.

As the seaweed-like strips, any of such plastic tapes as, for example, foamed or unfoamed tapes of polyolefin, and foamed tapes of polyamide, polyester, polyvinyl chloride and polyvinylidene chloride may be used so far as the apparent specific gravity thereof is less than 1.0.

The apparatus of the present invention comprises an artificial environment net separating the living zone of shrimp from the sea, and an artificial habitat mat optionally provided with planting seaweed-like soft plastic tapes in the base of a soft porous synthetic fiber lock material.

In the accompanying drawings,

FIG. 4 is a lateral view of the artificial habitat mat shown in FIG. 3;

FIG. 5 is a lateral view of other embodiment of the artificial environment cultivation according to the present invention; and FIG. 6 is a lateral view showing an embodiment of the water tank cultivation of crustaceans according to the present invention.

Figure 1:
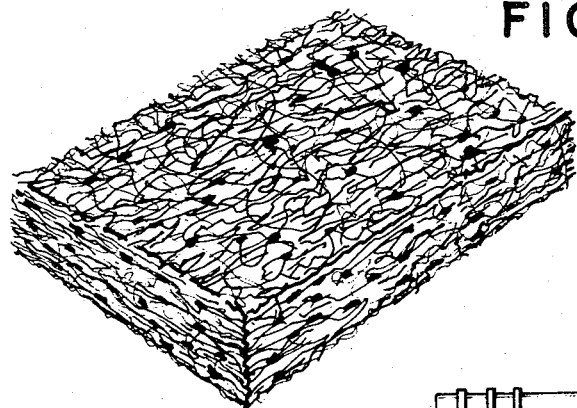
FIG. 1 is a perspective view of the habitat mat of the present invention.
Figure 2:
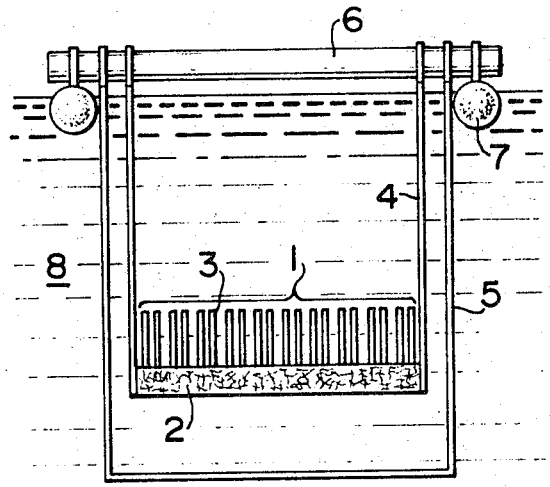
FIG. 2 is a lateral view showing an embodiment of the artificial environment cultivation according to the present invention.

Preferable artificial environment cultivation according to the present invention is carried out, as shown in FIG. 2 for example, by providing an artificial habitat mat 1 in an artificial environment net 5, and liberating and cultivating curstaceans at the post larvae stage in seawater surrounded by said artificial environment net 5. The artificial environment net 5 and the habitat mat 1 have been fixed to a frame 6, which is floated by means of a buoy 7, and is floating in the sea 8. The numeral 4 shows a frame supporting the habitat mat 1.

The artificial environment net 5 shown in FIGS. 2 and 5 is provided in order that crustaceans, particularly Kuruma shrimp, under cultivation do not escape from the cultivation farm, and that the cultivation farm can be prevented from foreign invasion. As the net 5, a net made of any material may be used so far as it permits easy circulation of sea water and is resistant to sea water. Particularly, the use of a fishing net made of polyamide, polyester, vinylidene chloride-vinyl chloride copolymer is practical and economical.

In assembling the apparatus of the present invention, two habitat mats 1 and 2 may be fixed to the supporting frame 4, as shown in FIG. 5. If necessary, three or more habitat mats may be provided. Each artificial environment tank may be covered at the top, if necessary, with a net which has a food-charging hole capable of being opened or closed by means of a fastener or the like.

In addition to the artificial environment cultivation, there may be conducted the cultivation of such type that as shown in FIG. 6, a habitat mat 1 is provided in a water tank having a partition wall 5A, which does not allow the natural circulation of sea water.

Advantages of the present invention are as enumerated below.

1. The apparatus can be simply assembled not using natural products but using only artificial products which can be produced in large quantities on commercial scale and thus are uniform in quality.

2. The habitat mat is composed of such porous lock material as mentioned previously, so that sea water can be easily circulated to make it possible to exclude residual foods, excrements and gases and to maintain the habitat environment in a favorable state, with the result that a high yield can be attained.

3. The size of materials used in the habitat mat has been suitably selected, so that the living bodies, particularly nails, of shrimp at the larvae stage are not injured at the time when they alight on or leave off from the mat.

4. The habitat mat is composed of a synthetic fiber of a vinylidene chloride vinyl chloride copolymer, polyamide, polyester, polypropylene or the like or a mixed synthetic fiber composed mainly of said fiber, and hence can be easily settled in the sea.

5. The habitat mat is excellent in resistance to water and sea water and is not corrosive, so that it can be used semi-permanently.

6. The seaweed-like strips planted in the mat are plastic tapes of less than 1.0 in specific gravity which are insufficient in vertical self-sustainability in an ordinary state but can softly erect upright in water due to buoyancy, so that the strips do not disturb the exercise of shrimp nor injure the living bodies thereof.

Since the habitat mat has such structure as mentioned above, water can circulate favorably and a uniform environment can be easily maintained over the whole habitat mat. Moreover, the cleaning and exchange of the habitat mat are quite easy.

When the seaweed strips planted in the mat are controlled in density, a large number of shrimp are simultaneously inhabitable without contacting the individual bodies with one another.

7. The habitat mat is lighter than that of the prior art, and hence is easier in trasportation and setting.

8. It is possible to attain a yield higher than the yields reported hitherto.

9. Since the apparatus has no fixed equipment, there is such advantage that even when unexpected sea contamination has broken out, the apparatus can be evacuated urgently.

10. In case a disease or the like has broken out for a certain cause, only the attached environment can be removed or exchanged with extreme ease.

The habitat mat of the present invention is capable of breeding from about 200 to 400 shrimps per unit area (m²), when they are relatively small. As they grow bigger, the cultivation density for the habitat mat of the present invention is suitably within the range from about 100 to about 200 shrimps/m². The cultivation period may be variable from 6 to 24 months. Usually, baby shrimp grow to adulthood within 6 to 12 months.

The present invention is illustrated below with reference to an example.

EXAMPLE

Figure 3:
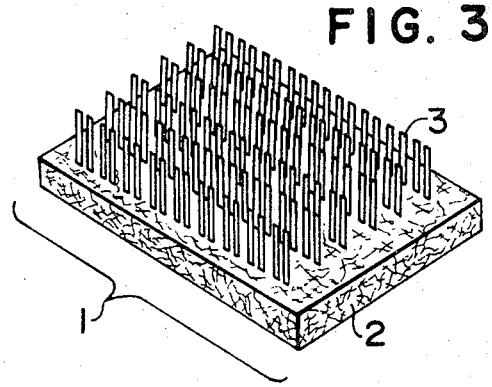
FIG. 3 is a slant view showing an embodiment of the artificial habitat mat of the present invention.

Two artificial environments of 4 m. in length, 4 m. in width and 2 m. in depth which were of the structure shown in FIG. 2 were individually fixed by means of a woodframed float and an anchor in the sea water of Akamizu Bay, Nobeoka City, Miyazaki Pref., Japan. As the artificial environment nets were used polyamide fishing nets with meshes having a length of one side of 10 mm. As the habitat mats were used those of the structures shown in FIGS. 3 and 4. As the base mat was used Saran Lock (trade name; produced by Asahi Dow Co., Ltd.) having a porosity of 0.04 which was composed of a 0.05 mm diameter saran fiber. As the seaweedlike strips were used low density polyethylene film tapes of 10 mm. in width and 0.1 mm. in thickness. The tapes were planted in the base mat so that their heights became 100 mm. and their intervals became 50 mm.

In the thus constructed artificial environments, young Kuruma shrimp of 55 days after hatching which had been cultured indoors were cultivated for 9 months. The shrimp were fed every other day with 20% based on the total weight thereof of minced saurel meat. The results of test were as shown in the following table:

| Date of measurement | Number of shrimp | Total weight (kg) | Body length (mm) | Body weight (g) | Yield (%) |
|---|---|---|---|---|---|
| At the time of liberation (February 1) | 3,826 | 2.9 | 50 (62–42) | 0.76 | 100 |
| On the 25th day | 3,645 | 9.5 | 73 (91–49) | 2.60 | 95.3 |
| On the 110th day | 3,423 | 30.2 | 106(115–74) | 8.82 | 89.5 |
| On the 130th day | 2,975 | 40.0 | 138(149–92) | 13.43 | 77.8 |
| On the 150th day | 2,798 | 53.5 | 176(187–134) | 19.12 | 73.1 |

The total weight is an actually measured value; the body length is an average body length of 30 shrimp; and the body weight is an average body weight of 30 shrimp.

The temperatures of sea water during the cultivation were as shown in the following table:

| Month | 1 | 2 | 3 | 4 | 5 | 6 | 7 | 8 | 9 |
|---|---|---|---|---|---|---|---|---|---|
| Seawater temp. (°C.) | 13.3 | 15.0 | 17.1 | 20.6 | 23.2 | 24.0 | 26.8 | 25.1 | 22.5 |

Forelegs and body colors of the harvested shrimp were identical with those of natural shrimp, and thus it was confirmed that the high density cultivation of Kuruma shrimp is possible according to the method of the present invention.

From the above-mentioned example, it is clear that according to the method of the present invention, the yield of shrimp per $m^2$ is more than 3 kg.

What is claimed is:

1. A habitat mat for artificial cultivation of shrimp, which comprises a porous composite having an interconnected three-dimensional reticular structure formed by the entanglement of a synthetic fiber lock resistant to sea water, and seaweed-like plastic tapes which are planted on the composite to provide one tape per 4 to 25 $cm^2$ of said mat, said tapes having a thickness of less than 0.1 mm. and a length of from 50 to 200 mm.

2. A habitat mat according to claim 1, wherein the synthetic fiber lock is a polyvinylidene chloride type fiber, a polyamide fiber or a polyester fiber.

3. A habitat mat according to claim 1, wherein the composite has a bulk density of from 0.03 to 0.15 $g/cm^2$.

4. A habitat mat according to claim 1, wherein the fiber for the synthetic fiber lock has a diameter of from 0.03 to 0.3 mm.

5. A habitat mat according to claim 1, of brownish color.

6. A habitat mat according to claim 1, wherein the seaweed-like plastic film tapes are foamed tapes of less than 1.0 in apparent specific gravity of a resin selected from the group consisting of a polyamide, a polyester, a polyvinyl chloride and a vinyl chloride-vinylidene chloride copolymer.

7. A habitat mat according to claim 1, wherein the seaweed-like plastic film tapes are foamed or unfoamed tapes of polyolefin.

8. An apparatus suitable for high density cultivation of shrimp which has an artificial environment net separating the habitat zone of shrimp from the ocean, and at least one habitat mat as defined in claim 1, said habitat mat being suspended in said artificial environment net.

9. A method for cultivation of shrimp which comprises liberating, cultivating and growing leg-bearing baby shrimp in the apparatus as defined in claim 8.

* * * * *